United States Patent
Andrews

(10) Patent No.: US 10,209,606 B1
(45) Date of Patent: Feb. 19, 2019

(54) SELFIE STAND APPARATUS AND METHOD OF USE

(71) Applicant: Joseph Andrews, Conway, AR (US)

(72) Inventor: Joseph Andrews, Conway, AR (US)

( * ) Notice: Subject to any disclaimer, the term of this patent is extended or adjusted under 35 U.S.C. 154(b) by 0 days.

(21) Appl. No.: 15/816,565

(22) Filed: Nov. 17, 2017

Related U.S. Application Data

(60) Provisional application No. 62/423,457, filed on Nov. 17, 2016.

(51) Int. Cl.
| | | |
|---|---|---|
| *G03B 17/56* | (2006.01) | |
| *F16M 11/22* | (2006.01) | |
| *F16M 11/04* | (2006.01) | |
| *F16M 11/08* | (2006.01) | |
| *F16M 11/10* | (2006.01) | |

(52) U.S. Cl.
CPC ......... *G03B 17/561* (2013.01); *F16M 11/041* (2013.01); *F16M 11/08* (2013.01); *F16M 11/10* (2013.01); *F16M 11/22* (2013.01)

(58) Field of Classification Search
None
See application file for complete search history.

(56) References Cited

U.S. PATENT DOCUMENTS

| | | | | |
|---|---|---|---|---|
| 5,119,203 A | * | 6/1992 | Hosaka | H04N 5/2251 248/179.1 |
| 2005/0265711 A1 | * | 12/2005 | Heibel | B60R 11/04 396/419 |
| 2008/0107413 A1 | * | 5/2008 | Moore | G03B 17/561 396/428 |
| 2009/0220225 A1 | * | 9/2009 | Boneschanscher | F16M 11/041 396/428 |
| 2010/0155549 A1 | * | 6/2010 | Robinson | F16M 11/10 248/183.1 |
| 2011/0006170 A1 | * | 1/2011 | Liu | F16M 11/041 248/121 |
| 2011/0222842 A1 | * | 9/2011 | Schippers | F16M 11/10 396/428 |
| 2014/0231601 A1 | * | 8/2014 | Wu | G03B 17/561 248/163.1 |
| 2015/0047173 A1 | * | 2/2015 | Silva | H04B 1/38 29/428 |
| 2015/0346588 A1 | * | 12/2015 | Hudson | G03B 17/561 248/220.22 |

* cited by examiner

*Primary Examiner* — William B Perkey
(74) *Attorney, Agent, or Firm* — Eldredge Law Firm, LLC; Richard Eldredge; Beth Felix

(57) ABSTRACT

A selfie stand apparatus enables a fixture to be permanently installed in a location where taking pictures of one's self is common. The stand accommodates holding cameras, phones or the like of many configurations. The camera is placed on the stand and a timer or remote activator can be used to take a picture.

5 Claims, 4 Drawing Sheets

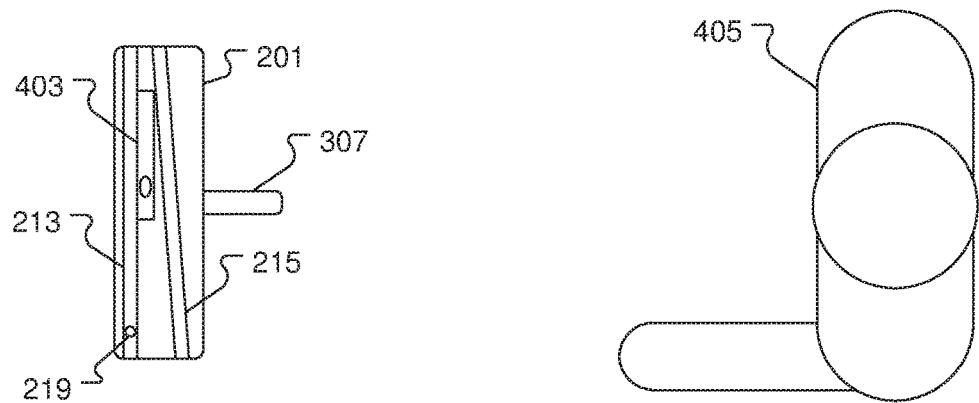
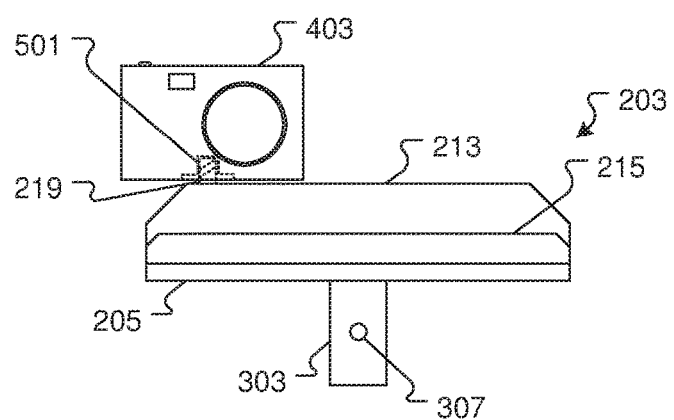
FIG. 4
FIG. 5

SELFIE STAND APPARATUS AND METHOD OF USE

BACKGROUND

1. Field of the Invention

The present invention relates generally to camera supports, and more specifically, to a camera selfie support system for holding a camera while selfies are taken. A selfie being a picture of a person taken by the same person.

2. Description of Related Art

Photography stands are well known in the art and are effective means to capture pictures via a camera. For example, FIG. 1 depicts a conventional camera support system 101 having a tripod 103 for securing a camera 105 at a height relative to the ground. During use, the camera 105 secures to the tripod 103 to take a picture of a person 107.

One of the problems commonly associated with system 101 is its limited use. For example, tripod 103 must be transported to the location where the picture is taken and transporting the tripod is cumbersome.

Accordingly, although great strides have been made in the area of camera supports, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 4 is a top view of the apparatus of FIG. 2;

FIG. 5 is a front view of the threaded connector of FIG. 2; and

Figure 1:
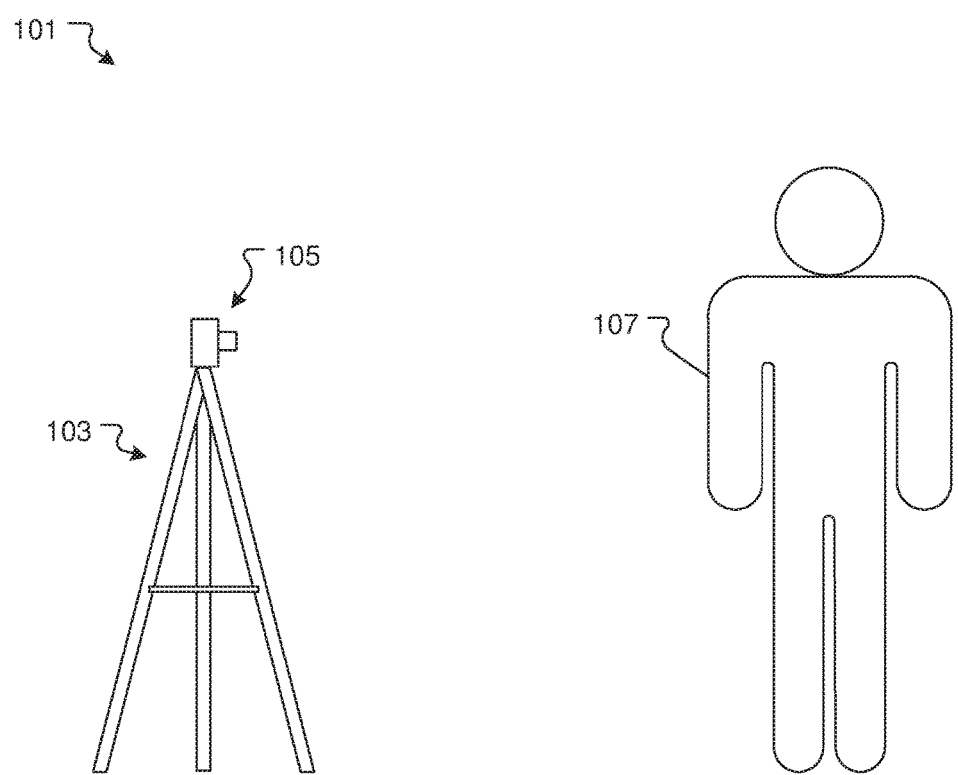
FIG. 1 is a side view of a conventional camera support system.
Figure 2:
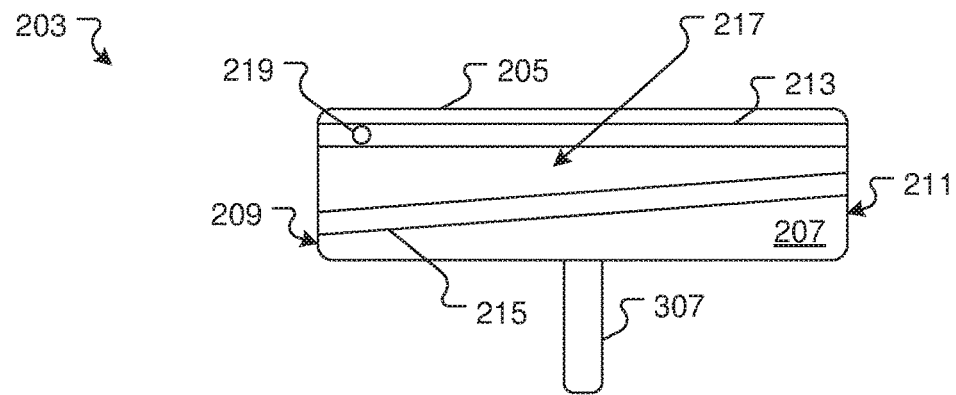
FIG. 2 is a top view of a selfie stand apparatus in accordance with a preferred embodiment of the present application.
Figure 3:
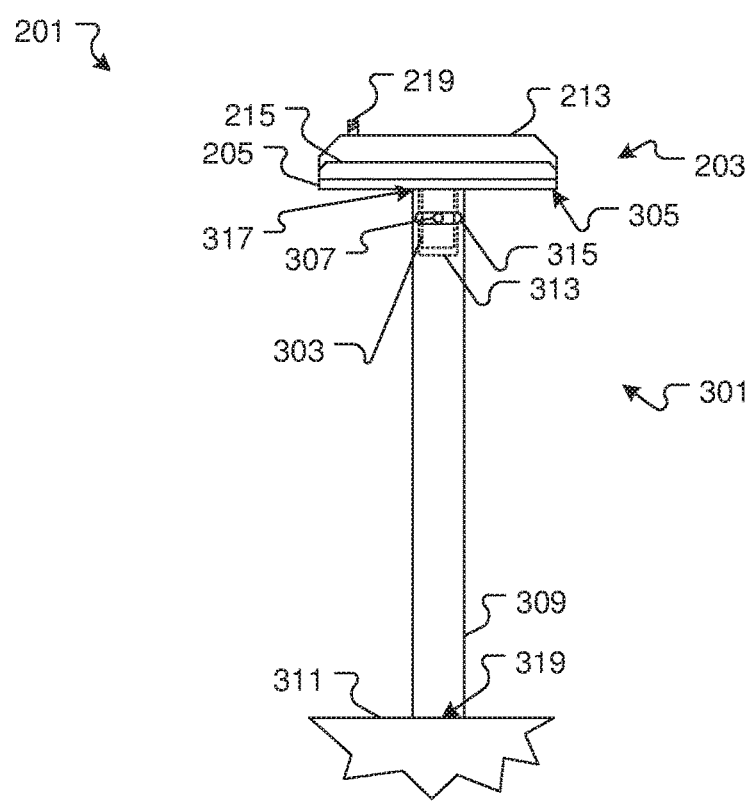
FIG. 3 is a front view of the apparatus of FIG. 2.

While the apparatus and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the apparatus and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The apparatus and method of use in accordance with the present application overcomes one or more of the above-discussed problems commonly associated with conventional camera support systems. Specifically, the apparatus of the present application provides a universal camera support at locations where pictures are commonly taken. These and other unique features of the apparatus and method of use are discussed below and illustrated in the accompanying drawings.

The apparatus and method of use will be understood, both as to its structure and operation, from the accompanying drawings, taken in conjunction with the accompanying description. Several embodiments of the apparatus are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-5 depict various views of a selfie stand apparatus 201 in accordance with a preferred embodiment of the present application. It will be appreciated that apparatus 201 overcomes one or more of the above-listed problems commonly associated with conventional camera support systems.

In the contemplated embodiment, apparatus 201 includes a camera support fixture 203 that securely holds a camera 403 at a height relative to the ground surface. In the contemplated embodiment the camera support fixture is rotationally attached to a support stand 301.

The camera support fixture 203 includes a platform 205 having a top surface 207, a first end 209 and a second end 211. A first elongated support 213 extends away from and is rigidly attached to the top surface 207 of platform 205. A second elongated support 215 extends away from and is rigidly attached to the top surface 207 of platform 205. The first 213 and second elongated supports 215 are oriented at an angle relative to each other and form a tapered space 217 that narrows from the first end 209 to the second end 211 of platform 205. The tapered space 217 allows a camera 403 to be wedged between the sides of the first elongated support 213 and the second elongated support 215. A threaded connector 219 is rigidly attached to the first elongated support 211 and is configured to temporarily attach a camera 403 to the fixture 203.

The camera support fixture 203 further includes a rotation rod 303 rigidly attached to the bottom surface 305 of platform 205. The rod 303 is configured to slidingly engage with a hollow support stand 301. A handle 307 extends outwardly from the rotation rod 303 and is used to rotate the fixture 203 with respect to the support stand 301.

The support stand 301 includes a hollow shaft 309 with a top end 317 and a bottom end 319 that is rigidly attached to the ground 311. Shaft 309 includes a cylindrical cavity 313 in top end 317 to accept the rotation rod 303 of camera support fixture 203. The rotation rod 303 rotationally sits in cylindrical cavity 313 and allows the camera support fixture 203 to rotate with respect to shaft 309. A slot 315 extends through shaft 309 near and parallel to top end 317. The handle 307 is configured to protrude from slot 315, which in turn limits the rotation angle of camera support fixture 203. During use, the handle 307 enables a user to rotate the camera support fixture 203.

During use, one or more cameras 403 are placed in tapered space 217 and are moved towards the second end 211 of platform 205 where the tapered space 217 narrows to securely hold camera 403 while a selfie is taken of a user 405 or some other object. Alternatively the threaded connector 219 screws into a threaded receptacle 501 of camera 403 temporarily holding the camera 403 to the apparatus 201 in lieu of placing the camera 403 in the tapered space 217.

It should be appreciated that one of the unique features believed characteristic of the present application is that the first elongated support 213, second elongated support 215 and the resulting tapered space 217 enable a camera 403 to be securely held while a picture is taken. It will also be appreciated that apparatus 201 is located in a place where pictures are commonly taken eliminating the need for the users 401 to carry individual camera support devices. It will also be appreciated that shaft 309 could be replaced by another type of support, e.g. a wall at the location, without deviating from the intent of this disclosure.

Figure 6:
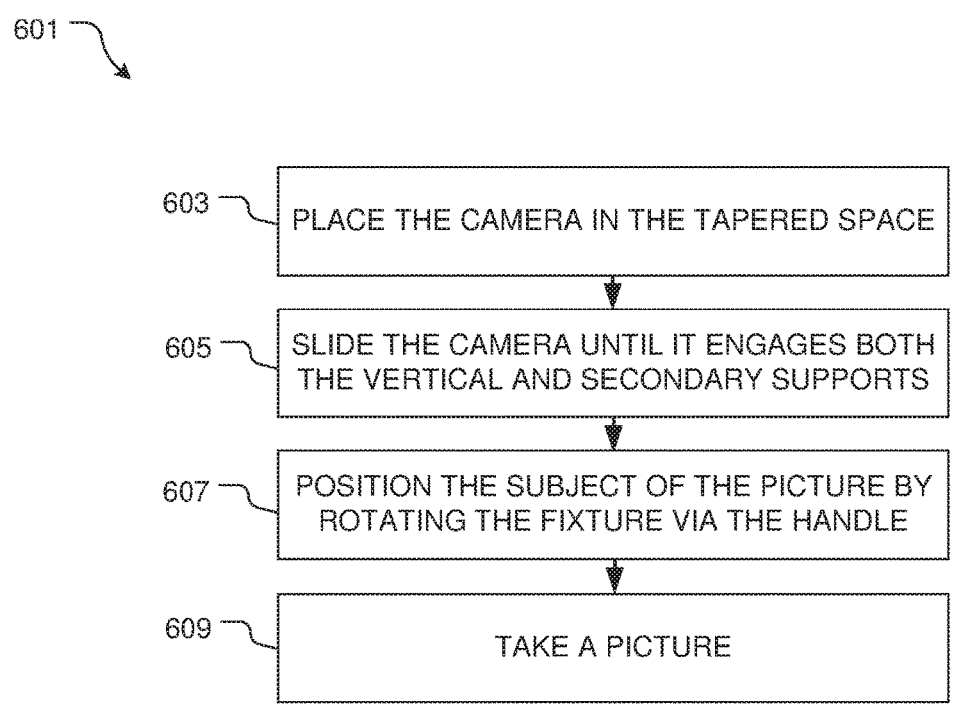
FIG. 6 is a flowchart of the preferred method of use.

Referring now to FIG. 6 the preferred method of use of the apparatus 201 is depicted, method 601 comprising placing a camera in the tapered space 603, sliding the camera until it engages both the first elongated support and the second elongated support 605, positioning the subject of the picture by rotating the fixture via the handle 607 and taking a picture 609.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A selfie stand apparatus comprising;
    a shaft extending from a top end to a bottom end and configured to extend above the ground surface;
    a camera support fixture having:
        a platform with a top surface, a bottom surface, a first end and a second end;
        a first elongated support rigidly attached to the top surface and extending away vertically from the top surface;
        a second elongated support rigidly attached to a top surface and extending away vertically from the top surface, the second elongated support oriented at an angle relative to the first elongated support; and
        a threaded connection extending from the top surface;
        wherein the first elongated support and the second elongated support create a tapered space therebetween to receive a camera device and secure the camera device in an upright position, the camera device resting on the top surface and in between the first elongated support and the second elongated support.

2. The selfie stand apparatus of claim 1 wherein a rotation rod is rigidly attached to the bottom surface of the platform and engages with the shaft.

3. The selfie stand apparatus of claim 2 wherein a handle extends outwardly from the rotation rod and is configured to rotate the platform via the rotation rod.

4. The selfie stand apparatus of claim 1 wherein the bottom end of the shaft is rigidly attached to the ground.

5. A method to take a selfie comprising;
    providing the selfie stand apparatus of claim 1;
    placing the camera device in the tapered space;
    sliding the camera device along the top surface of the platform in the tapered space until the camera engages both the first elongated and second elongated supports;
    positioning a subject of the picture by rotating the platform; and
    taking a picture.

* * * * *